United States Patent Office 3,003,478
Patented Oct. 10, 1961

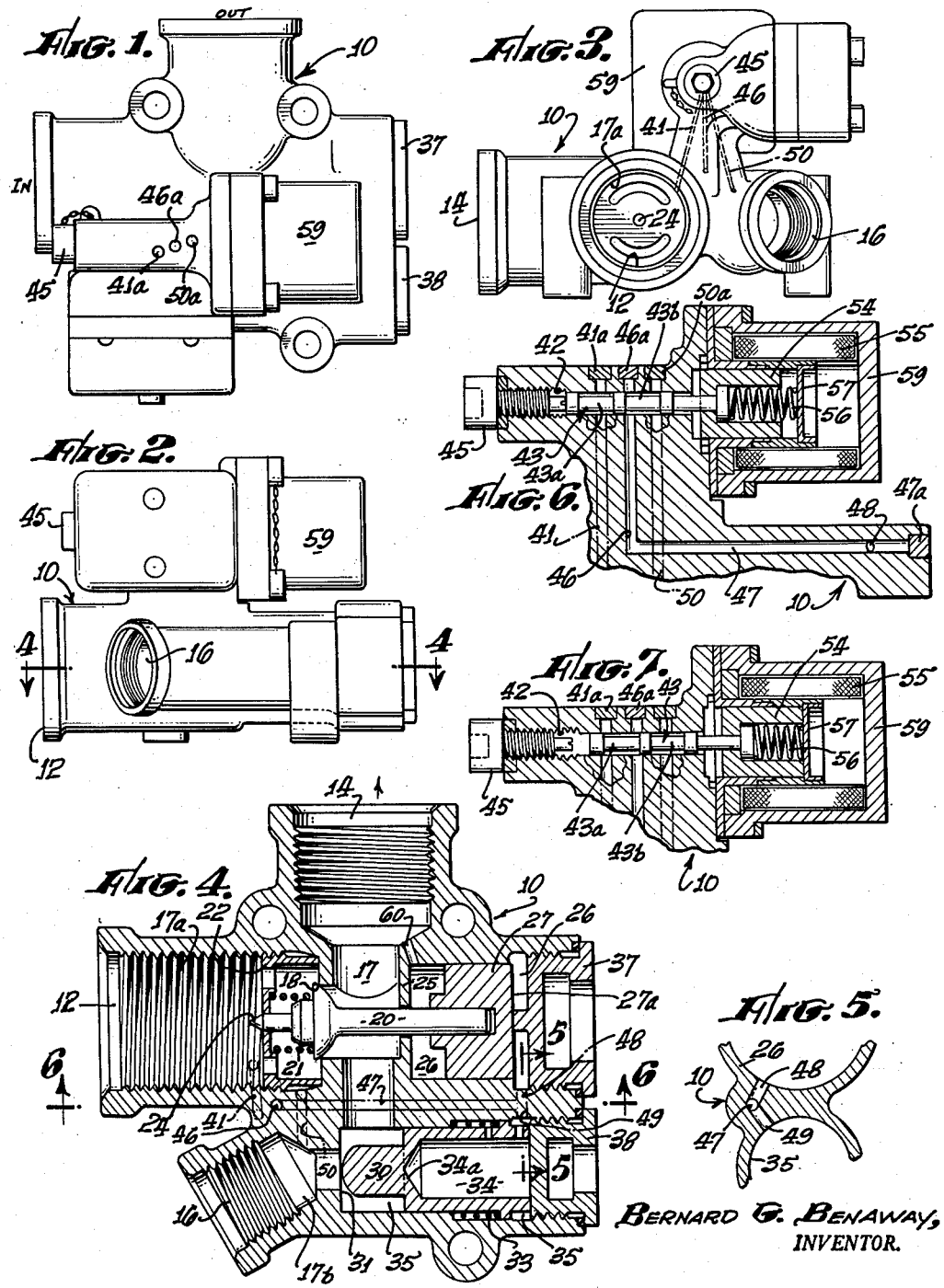

3,003,478
PILOT-OPERATED SELECTOR VALVE
Bernard G. Benaway, Granada Hills, Calif., assignor, by mesne assignments, to Sterer Engineering and Manufacturing Company, North Hollywood, Calif., a corporation of California
Filed May 24, 1960, Ser. No. 31,333
12 Claims. (Cl. 121—157)

The present invention relates generally to valves for controlling fluid flow; and more especially to pilot-operated valves placed in a high-pressure hydraulic control system to regulate the flow of operating fluid to and from a motor unit.

Control systems of this character are used extensively in airplanes and the like to effect operation of various types of equipment, the power for operation being derived from a pump or the like which delivers operating fluid at high pressure. Operating pressures are kept as high as possible in order to reduce the size and weight of the control system to a minimum. The valve with which the present invention is concerned is inserted in the closed system to regulate the flow of high pressure fluid from the source of fluid under pressure to a motor unit, and then allow return of the fluid through the valve at a lower pressure to the return portion of the pressure source.

Valve mechanisms in this type of service must meet severe operating conditions and known designs have various shortcomings which it is proposed to overcome by novel features of the present design. Most of these shortcomings have to do with problems concerned with leakage of the operating fluid, malfunction of the valve as a result of strain or distortion, excessive surge pressures and adaptability of the valve to high operating temperatures within the range at which non-metallic sealing elements deteriorate, causing excessive leakage.

In valves of this type heretofore known, extensive leakage has occurred, especially in the higher temperature ranges, when the main valve is a lapped piston or the like. This is a result of the fact that the lapped diametrical clearance cannot be reduced to the desired minimum to avoid leakage because when the piston is lapped into the cylinder with such small clearance, any deformation of the body due to mounting stresses, plumbing line stresses, high temperature stabilization of the body, or other thermal changes often causes binding of the lapped piston in the valve body. Also, any dirt in the fluid causes galling between the closely fitting moving members.

A closely allied problem is sticking of the main valve spool in its actuated position. Lapping the piston of this valve into its cylinder with such small clearance as is necessary to avoid excessive leakage increases the amount of force applied to the piston necessary to return it from its actuated position to its normal position. The power is normally applied in valves of this type to move them to the actuated position, return being under the influence of a biasing spring. When the force required to return the piston from its actuated position is greater than can be applied by a biasing spring, the piston may hang up in its actuated position with the result that the entire valve malfunctions. The alternative is power actuation in both directions which is obviously undesirable since it complicates the construction of the entire valve mechanism.

Another problem encountered with known types of valves is excessive surge pressures created by the valve during opening or closing of the valving members. These high surges may cause rupturing of the hydraulic lines that are connected to the valve. These surges which are often transmitted to the fluid return lines may be of sufficient magnitude to cause other units that are connected to the same return line to actuate or change their valving positions. Units, such as pressure switches, that are in these lines and receive surge pressures will often actuate or fail as a consequence.

It is a general object of my invention to provide a pilot operated valve mechanism which employs check type valves for the main valves in order to reduce to zero any leakage past the main valves.

It is also an object of the invention to confine any leakage of operating fluid to the pilot valve where leakage can be properly controlled because of the small size of the pilot piston.

Another object of the present invention is to provide a pilot operated valve in which surge pressures are reduced to a minimum.

A further object of the invention is to provide a pilot-operated valve of the character described which operates satisfactorily without O-rings or other non-metallic sealing means and is therefore adapted for operations at high temperatures at which such sealing means deteriorate and eventually cause prohibitive leakage of operating fluid.

A further object of the present invention is to provide a valve of the character with which we are here concerned, which is of such a design as to eliminate as far as possible the need for excessively close fits of moving parts and thus eliminates malfunctioning of the valve caused by warping or distortion of moving parts which causes these parts to bind.

These advantages of my invention are attained in a pilot controlled selector valve having a body provided with internal fluid passages interconnecting an inlet port, cylinder port, and a return port, by providing two separate valving members, a primary valve and a secondary valve, which are of the check valve type. The primary valve controls flow of operating fluid into the body and to the cylinder port from the inlet port and is biased to a normally closed position. The secondary valve controls flow of the operating fluid from the cylinder port and out of the body by way of the return port, the secondary valve being biased to a normally open position. Piston means is associated with each of these two valves that is adapted to move the respective valve member to an alternate position in response to fluid pressure applied to the piston means from the inlet port. Means are provided for controlling the application of fluid pressure to said piston means, such control means including a pilot valve, passage means communicating between the pilot valve and the inlet port and the cylinder port respectively, and other passage means communicating between the pilot valve and said piston means, and suitable means for moving the pilot valve between selected operating positions. The pilot valve is normally biased to one position and is movable to an alternate position by suitable mechanism, as for example an electrical solenoid.

How these and other objects and advantages of my invention are attained, will be more readily understood by reference to the following description and to the annexed drawing in which:

FIG. 1 is a plan view of a valve constructed according to my invention.

FIG. 2 is a side elevation thereof viewing the side at the bottom of FIG. 1.

FIG. 3 is a side elevation thereof viewing the side at the left of FIG. 1.

FIG. 4 is an enlarged transverse section on line 4—4 of FIG. 2 showing the primary and secondary valves in the normal positions to which they are biased.

FIG. 5 is a fragmentary section on line 5—5 of FIG. 4.

FIG. 6 is a vertical section on line 6—6 of FIG. 4, passing through the pilot valve located above the plane of FIG. 4 and showing the fluid passage means extending between the pilot valve and the piston means operating the primary and secondary valves.

FIG. 7 is a fragmentary view similar to FIG. 6 showing the pilot valve in an alternate position.

Referring now to the drawing, it will be seen that the main body of the valve mechanism is indicated generally at 10. This body, as is seen best in FIG. 4, has internal fluid passageways that interconnect three ports which open to the exterior of the body, inlet port 12, cylinder or outlet port 14 and return or exhaust port 16. The body is threaded internally in the vicinity of each of these ports in order that there may be attached conduits, not shown in the drawings, for conducting hydraulic fluid to and away from the valve. Port 12 is connected to a source of fluid under pressure, port 14 to a cylinder or other device to be actuated, and port 16 to the fluid return portion of the pressure source. The internal passageway indicated generally at 17 extends between ports 14 and 16 and connects with a branch passage 17a at a location intermediate these ports. In this branch passage 17a leading to inlet port 12 is valve seat 18 which is engaged by poppet valve 20.

Valve 20 is urged to a normally closed position as shown in FIG. 4 by compression spring 21 which bears against the outer end of the valve and also against spider 22 which is threaded and screwed into the fluid passageway 17a, or otherwise held in place by any suitable means. Poppet valve 20 thus acts as the check valve to regulate flow of fluid into and through the valve body, entering from inlet port 12. Spider 22 is preferably provided with an axial opening through which extends pin 24 on the end of the valve in order to guide and support the valve in its movement between open and closed positions.

The stem of poppet 20 extends through a web 25 of body 10 with slight clearance, the web defining one end of the cylinder 26 in which piston 27 reciprocates. The end of the stem of valve 20 is slidably received in an axial bore in piston 27 to support and guide the valve from that end, the piston actuating the valve to move it to an open position, as will be described later. Valve 20 is referred to as the primary valve of the valve mechanism since it controls the flow of operating fluid into the body from inlet port 12, such fluid normally passing through the body to reach the cylinder port 14 on the way to an operating cylinder or other motor unit, not shown in the drawing.

A secondary valve 30 is also provided which normally is held in the open position shown in FIG. 4 but can move to engage seat 31 on body 10 and thus close off a portion 17b of fluid passage 17. Secondary valve 30 controls fluid flow out of the body through exhaust port 16. Valve 30 is also a check-type valve but is normally held in the open position by means of compression spring 33 which surrounds the hollow piston 34 upon the forward end of which valve 30 is mounted. Spring 33 bears against a fixed shoulder of body 10 and also against an annular flange extending around piston 34 to urge the valve and piston to the right in FIG. 4. Piston 34 is slidably mounted in a cylindrical bore 35 in the valve body, the forward portion of cylinder 35 communicating with fluid passage 17. The cylinders 26 and 35 conveniently open to the exterior of body 10 and at these ends are closed by removable screw plugs 37 and 38 respectively. It will be noted that the travel of pistons 27 and 34 to the right under the influence of springs 21 and 33 respectively is limited in each case by engagement with the screw plug closing the end of the associated cylinder.

Piston 27 and piston 34 each constitute piston means associated with one of the main valves of the device to actuate the associated main valve in response to fluid pressure applied to the working faces of these pistons. For this purpose, operating fluid is conducted to the working faces 27a and 34a of the pistons 27 and 34 respectively by a plurality of fluid passages through which flow of operating fluid under pressure from inlet port 12 is controlled by a pilot valve arrangement. The first of these fluid passages is passage 41 shown in FIGS. 3 and 6. This passage extends from fluid passage 17a, at a point between port 12 and valve 20 to a horizontal cylindrical bore 42 within which pilot valve spool 43 reciprocates axially with the bore. The outer end of bore 42 is closed by a screw 45 which, as shown in FIG. 6, engages the valve spool to limit its travel to the left within bore 42.

Fluid passage 41 may conveniently be formed by drilling a single small diameter bore from the exterior of body 10 through cylinder 42 to terminate at a suitable position within fluid passage 17a. The outer end of the bore is then closed by plug 41a.

In a similar manner, a second bore 46 is drilled into body 10 at a position spaced along the axis of cylinder 42 from bore 41, the outer end of this bore being closed by plug 46a. The inner end of bore 46 is intersected as seen in FIG. 6 by bore 47 drilled at right angles thereto from the exterior of body 10, with its outer end closed by plug 47a. Near its outer end, passage 47 is intersected by two branch passages 48 and 49 which, as shown in FIG. 5, respectively communicate with cylinder 26 and cylinder 35. Thus the series of passages 46, 47, 48 and 49 permits transmission of fluid pressure from valve bore 42 to the working faces of pistons 27 and 34 located within cylinders 26 and 35.

A third one of these fluid passages is indicated at 50 and extends between bore 42 and fluid passage 17b within the body, communicating with the latter at a point between exhaust port 16 and valve 30. Passage 50 is drilled into the body at a point axially spaced along cylinder 42 from passage 46, the outer end of the passage being then closed by plug 50a.

Pilot valve 43 is a spool type valve having three full diameter sections spaced apart by two intervening reduced diameter sections. The sections of full diameter are lapped to fit cylindrical bore 42 with a minimum clearance to reduce leakage of fluid within the bore to a minimum, while at the same time providing free longitudinal movement of the valve spool. The axial lengths of the two sections 43a and 43b of reduced diameter are related to the axial spacings between the three fluid passages 41, 46 and 50. These lengths are such that when the valve is in its normal position of FIG. 6, communication is provided between passages 46 and 50 at the reduced diameter section 43b of the valve, since the full diameter sections at either end of this section 43b uncover, at least in part, the ends of passages 46 and 50. At the same time there is no communication between passage 41 and the other passages 46 and 50 since the center full diameter section isolates passage 41.

When the pilot valve is moved to the alternate or actuated position as shown in FIG. 7, communication between passages 41 and 46 is provided at the reduced diameter section 43a, the center section of full diameter being moved to a position at which it blocks communication with passage 50. The ends of passages 41 and 46 at cylinder 42 are uncovered, at least in part, when the valve is in this alternate position.

Valve 43 extends beyond 42 at one end and has on that end a head which is engaged by a movable core 54 of solenoid 55 within housing 59. Core 54 is movable parallel to the axis of spool 43 and spring 56 interposed between the head of the spool and fixed wall 57 normally urges the pilot valve to the position of FIG. 6 in which both the passages 46 and 50 are shut off from communication with passage 41 which supplies operating fluid under pressure.

When solenoid 55 is energized, core 54 moves to the right against the force of compression spring 56, pulling valve 43 to the alternate position shown in FIG. 7. When the solenoid is de-energized, spring 56 returns the valve spool and the solenoid core to the normal rest position, the travel being limited by contact of the valve with adjusting screw 45 by which the exact rest position of spool 43 can be adjusted.

The details of the solenoid 55 form no part of the present invention and therefore are not discussed in detail here. Any suitable type of solenoid may be employed that will actuate the pilot valve. Also it should be realized that the invention is not necessarily limited to the use of a solenoid for actuation of the pilot valve as any other suitable mechanism may be substituted for the solenoid.

Having described the construction of a preferred embodiment of my valve mechanism, I will now explain its operation. In this description the normal or rest position of the parts is that occupied when solenoid 55 is de-energized so that pilot valve 43 occupies the position shown in FIG. 6 and the main valves 20 and 30 occupy the position shown in FIG. 4.

In this normal position, pilot valve 43 interconnects fluid passages 46 and 50, thus placing the operating faces of pistons 27 and 34 in communication with return port 16. Since the pressure at the latter port is substantially zero, so also is the fluid pressure on the piston faces. Valve 20 is urged to the right under the force of spring 21 to engage seat 18 and piston 27 is also moved to the right in cylinder 26. Fluid pressure at the rear (left side) of the piston may carry it farther to the right, independently of the valve stem, until it comes into contact with a stop on a screw plug 37. Similarly, spring 33 moves the combined structure of valve 30 and piston 34 to the right, removing valve 30 from seat 31 to open passage 17 to the return port, the travel of the piston 34 to the right being limited by engagement with screw plug 38.

Under these conditions, valve 20 acts as a check valve closing off the branch passage 17a from the main passage 17 in order to prevent flow of fluid through the valve body from inlet port 12. In this position the pressure of the incoming fluid in passage 17a exerts a force on valve 20 in the direction that closes it against seat 18.

Both springs 21 and 33 are relatively light springs. By way of example, but without limiting the invention thereto, in a typical design these springs each have a force of two pounds. Of course other spring values may be used depending upon other features of the design.

When solenoid 55 is energized, core 54 is drawn to the right to the actuated position shown in FIG. 7, compressing spring 56. Pilot valve 43 has been now moved to a position in which it interconnects fluid passages 41 and 46 and shuts off communication between either of these passages and passage 50. Since passage 46 is always open to inlet port 12, fluid under pressure can now flow through passage 41 and around the reduced diameter section 43a of the pilot valve into passage 46 from which it enters the ends of cylinders 26 and 35 through branch passages 48 and 49 respectively. The fluid under pressure exerts a force on the working faces 27a and 34a of the two pistons 27 and 34 urging the pistons to the left in the drawing. Because of the restricted size of these passages, pressure builds up ahead of the pistons over a short but finite interval of time.

The area of piston 34 exposed to this fluid pressure is designed to be such that when the fluid pressure on the piston reaches some low value, for example 10 p.s.i., the total force on the piston is sufficient to overcome the force of spring 33 and valve 30 is closed by the force applied by the operating fluid. When closed, valve 30 acts as a check valve to retain fluid in the main section of passage 17, which has the advantage that there is no leakage when the valve is seated against seat 31.

The pressure ahead of pistons 34 and 27 continues to build up after valve 30 is closed and eventually reaches a unit pressure sufficient that piston 27 is moved to the left, opening valve 20 against the opposing force applied to the valve by the force of incoming fluid in inlet 12. This unit value of the fluid pressure is higher than that at which valve 30 closes so that valve 30 is surely closed before valve 20 opens. Because of the fact that the fluid exerts opposing forces on valve 20 over fixed areas, valve 20 is opened when the unit pressure on piston 27 exceeds some predetermined fraction, say one-third, of the inlet pressure at port 12. At this pressure, the total force on piston 27 tending to move it to the left exactly balances the combined fluid and spring pressure tending to move the valve 20 to the right. Any increase in fluid pressure against the operating face of piston 27 is now able to move valve 20 to an open position, allowing operating fluid to flow from passage 17a into the main passage 17 and out of the body through cylinder port 14.

Once poppet 20 is opened, it will remain open as long as there is a pressure differential equal to or in excess of a certain predetermined differential between the fluid pressures at inlet 12 and the cylinder port 14. This differential pressure is of course established by the design of the valve, but may for example, be 20 p.s.i. The higher inlet pressure continues to be applied to the working face 27a of piston 27 to hold the valve open while the lower pressure at the cylinder port is the pressure applied to the opposite side of piston 27 and the difference in forces is sufficient to keep the poppet valve open. When the rate at which fluid flows out of cylinder port 14 drops to such an extent that the differential pressure is less than the established value, assumed to be 20 p.s.i., then valve 20 closes under the influence of spring 21; but it will reopen if, when flow is re-established, the pressure differential again exceeds 20 p.s.i.

When solenoid 55 is again de-energized, spring 56 returns pilot valve 43 to its normal position of FIG. 6. In this position the pilot valve shuts off the supply of operating fluid from passage 41 and permits the fluid in cylinder spaces 26 and 35 to be exhausted by reverse flow through passages 47, 46 and 50 into the low pressure zone adjoining return port 16. As the pressure behind these two pistons decays, the first thing that happens is that poppet 20 closes since the fluid pressure on piston 27 required to open this valve is higher than that required to open valve 30. A further decay in fluid pressure in these two cylinder spaces causes the pressure to reach the point where spring 33 opens valve 30, re-establishing communication between fluid passage 17 and a return port 16. This insures that the valves 20 and 30 operate in the reverse sequence, valve 20 closing before valve 30 opens following the return of the pilot valve to its rest position. However, the design is such that piston 34 cannot open valve 30 until the pressure on the operating face of piston 34 drops 25% or more below the cylinder pressure which exists in passage 17. This pressure is effective upon the annular back face of piston 34 surrounding valve 30, and, combined with the force exerted by spring 33, opens the valve 30. Once opened, of course the cylinder pressure drops to zero since it can exhaust through return port 16 and the force of spring 33 alone is exerted on piston 34 to keep the piston at the right hand position as shown in FIG. 4.

The stem of valve 20 passes through web 25 with sufficient clearance that hydraulic fluid from pasage 17 can enter the adjoining end of cylinder space 26. Consequently, static fluid pressure on both sides of web 25 are substantially equal; but it is preferred to vent the left end of cylinder 26 to fluid passage 17 through port 60 which permits free flow of hydraulic fluid into and out of this end of the cylinder. Web 25 protects piston 27 from the impact of hydraulic fluid entering passage 17 through the opening at valve seat 18 and thereby prevents the dynamic fluid forces from prematurely closing valve 20. In this way the static fluid pressure relationships described above are maintained.

When solenoid 55 is energized and the valve mechanism starts to move the parts to the actuated positions as already described, the fluid pressure building up against the operating faces 27a and 34a of the associated pistons causes a certain amount of fluid leakage past these pistons. This fluid leaks into internal passage 17 and the section of the valve adjoining cylinder port 14. With this construction, the leakage not only has no detrimental effect on the operation of the valves but favorably reduces surge pressures at the cylinder port by increasing cylinder port pressure to some finite value before the poppet valve 20 is moved off its seat. This is in contrast with known types of valves wherein the leakage would be to the return port and therefore would not be useable to reduce the surge pressures.

This leakage of operating fluid past the piston means into passage 17 causes some build-up of pressure in the internal fluid passage with the result that when poppet 20 opens the incoming fluid enters into a partly pressurized zone of the valve and the result is a substantial reduction in the maximum surge pressures over the corresponding pressures obtained in valves of conventional design. Thus it will be evident that pistons 27 and 34 do not need to be lapped into their associated cylinders and consequently the diametrical clearances between these members may be of sufficient magnitude that there is no danger of malfunction from these pistons sticking in their cylinders.

Leakage of operating fluid at the main points of control, that is valve 20 and valve 30, is reduced to zero, or substantially so, since these valves operate as check valves and are designed in such a manner that they engage tightly the valve seat.

From a review of the above description it will be seen that I have provided an advantageous design of a pilot-operated selector valve. The primary and secondary valving members are check-type valves which can close against a seat to hold high pressure hydraulic fluid without any leakage. Only at the pilot valve itself, it is necessary to have a close sliding fit to prevent leakage; and here the leakage is small since the valve is small. Leakage around the pistons operating the primary and secondary valving members is into the interior passage in a direction to go out the cylinder port. Here the leakage pressurizes the cylinder port zone prior to opening the primary inlet valve and so reduces the magnitude of pressure surges caused by sudden flow of incoming fluid. From a practical standpoint the reduction in surge pressures is a great advantage since the surge pressures heretofore have been two or more times the normal maximum pressures otherwise existing. This meant the systems must be much heavier and stronger than would be required to withstand normal operating pressures. In modern aircraft weight is at a premium and weight reduction is very important.

As pointed out, this is a demand-controlled valve. As demand for fluid at the cylinder port ceases, fluid pressure equalizes on both sides of the pilot piston controlling the inlet poppet and the spring closes the inlet or primary valve. As demand resumes, the primary valve automatically opens to allow fluid to flow out the cylinder port. This response is ordinarily not possible with a slide valve, as is often used here.

While I have disclosed the invention as applied only to a 2-position, 3-way valve, by doubling the units operating in this manner, the invention may be embodied in a 3-position, 4-way valve as well.

It will be apparent from the foregoing description that various changes in the construction and arrangement of the various parts of my improved valve structure may be made without departing from the spirit and scope of my invention.

Accordingly, it is to be understood that the above description is considered as being illustrative of, rather than limitative upon, the invention as defined by the appended claims.

I claim:

1. A pilot controlled selector valve mechanism, comprising:

a body having internal fluid passages interconnecting an inlet port, a cylinder port, and a return exhaust port;

a primary valve in said body controlling fluid flow into said body passages from the inlet port to said cylinder port, said primary valve being biased to a normally closed position shutting off fluid flow from the inlet port to said cylinder port;

a separate secondary valve in said body controlling fluid flow from the cylinder port through said body passages to said return port, said secondary valve being movable independently of said primary valve and biased to a normally open position placing said cylinder port in free communication with the exhaust port;

separate piston means associated with each of said valves adapted to move the associated valve to an alternate position in response to fluid pressure applied to the piston means; and means controlling application of fluid pressure individually to said piston means, including a pilot valve, first and second passage means in the body communicating between the pilot valve and the inlet port and the cylinder port respectively, third passage means communicating between the pilot valve and said piston means, and means moving the pilot valve between selected positions to control the application of fluid pressure to said piston means from the inlet port.

2. A valve mechanism as claimed in claim 1 in which the area subject to fluid pressure on the piston means actuating the secondary valve is less than the corresponding area on the piston means actuating the primary valve, whereby the primary valve is opened after the secondary valve is closed by fluid pressure from the inlet port applied to the respective piston means.

3. A valve mechanism as claimed in claim 1 in which the primary valve and the secondary valve are both check-type valves engaging fixed seats with metal-to-metal contact and having substantially zero leakage.

4. A valve mechanism as claimed in claim 1 in which the pilot valve moves between a first position establishing communication between the second and third passage means and an actuated position establishing communication between the first and third passage means while closing off the second passage means.

5. A pilot controlled selector valve mechanism comprising:

a body having internal hydraulic fluid passages interconnecting an inlet port, a cylinder port and a return exhaust port;

a first valve means in said body controlling fluid flow through said passages between the inlet port and said cylinder port, said valve means being biased to a normally closed position shutting off fluid flow from the inlet port to said cylinder port;

a separate second valve means in said body controlling fluid flow through said body passages between the cylinder port and the return port, said second valve means being biased to a normally open position placing said cylinder port in free communication with the exhaust port;

said first and second valve means being physically separate from each other and movable independently of each other;

separate piston means associated with each of the valve means adapted to move the associated valve means to an alternate position in response to hydraulic fluid pressure applied to the piston means;

and means including a pilot valve in the body controlling application of fluid pressure to said piston means to move said valve means to their alternate positions.

6. A valve mechanism as claimed in claim 5 in which the first and second valve means have their axes substantially parallel to each other.

7. A valve mechanism as claimed in claim 5 in which the second valve means includes a fixed seat engaged by a movable valve member, said valve member of the second valve means being located on the cylinder port side of the seat.

8. A valve mechanism as claimed in claim 7 in which said valve member in the closed position has an area exposed to hydraulic pressure from the cylinder port exerting a force on the valve member in a direction to open the valve means, said area being smaller than the area of the associated piston means moving the valve member to the alternate closed position.

9. A valve mechanism as claimed in claim 5 in which a leakage path of operating hydraulic fluid exists around the piston means associated with and actuating the second valve means and communicates with the fluid passages within the body at a position between the cylinder port and the second valve means and leads to the cylinder port when the second valve member is closed.

10. A valve mechanism as claimed in claim 5 in which a leakage path of operating hydraulic fluid exists around the piston means associated with and actuating the first valve means and communicates with the internal passages at a position between the cylinder port and the second valve member and leads to the cylinder port when the second valve member is closed.

11. A valve mechanism as claimed in claim 5 which also includes means causing sequential operation of the first and second valve means, the second valve means being closed before the first valve means is opened.

12. A valve mechanism as claimed in claim 5 in which the body has only a single cylinder port and only two separate valve means.

References Cited in the file of this patent

UNITED STATES PATENTS

| | | |
|---|---|---|
| 2,611,391 | Sainsbury et al. | Sept. 23, 1952 |
| 2,692,614 | McLeod | Oct. 26, 1954 |
| 2,754,840 | Hicks | July 17, 1956 |
| 2,940,475 | Hicks | June 14, 1960 |